United States Patent [19]

Chapman et al.

[11] Patent Number: 5,955,678

[45] Date of Patent: Sep. 21, 1999

[54] CRYOGENIC HIGH PRESSURE SENSOR MODULE

[75] Inventors: John J. Chapman, Gloucester; Qamar A. Shams, Yorktown, both of Va.; William T. Powers, Huntsville, Ala.

[73] Assignee: The United States of America as represented by the Administrator of the National Aeronautics and Space Administration, Washington, D.C.

[21] Appl. No.: 08/992,972

[22] Filed: Dec. 18, 1997

Related U.S. Application Data

[62] Division of application No. 08/778,065, Dec. 10, 1996, which is a continuation of application No. 08/681,245, Jul. 22, 1996, abandoned.

[51] Int. Cl.[6] ........................................................ G01L 7/00
[52] U.S. Cl. ................................................................ 73/756
[58] Field of Search ........................ 73/702, 704, 517 AV, 73/720, 721, 726, 727, 756, 714; 29/621.1

[56] References Cited

U.S. PATENT DOCUMENTS 5,165,289  11/1992  Tilmans ...................................... 73/702

*Primary Examiner*—William Oen
*Attorney, Agent, or Firm*—Robin W. Edwards

[57] ABSTRACT

A pressure sensor is provided for cryogenic, high pressure applications. A highly doped silicon piezoresistive pressure sensor is bonded to a silicon substrate in an absolute pressure sensing configuration. The absolute pressure sensor is bonded to an aluminum nitride substrate. Aluminum nitride has appropriate coefficient of thermal expansion for use with highly doped silicon at cryogenic temperatures. A group of sensors, either two sensors on two substrates or four sensors on a single substrate are packaged in a pressure vessel.

2 Claims, 4 Drawing Sheets

CRYOGENIC HIGH PRESSURE SENSOR MODULE

This is a divisional application of patent application Ser. No. 08/778,065, filed Dec. 10, 1996, which is a continuing application of patent application Ser. No. 08/681,245, filed Jul. 22, 1996, now abandoned, all of which are hereby incorporated by reference.

ORIGIN OF THE INVENTION

The invention described herein was jointly made by employees of the United States Government and a contract employee during the performance of work under NASA Contract NAS1-20043. In accordance with 35 U.S.C. 202, the contractor elected not to retain title.

BACKGROUND OF THE INVENTION

1. Technical Field of the Invention

The present invention relates generally to pressure sensors and specifically to pressure sensors to be used in high pressure, cryogenic environments.

2. Discussion of the Related Art

Pressure sensors are used to monitor fluid and gas pressures in a wide variety of applications. Many of these applications involve placing the sensors in environments that may damage the sensors or limit their accuracy. For example, in wind tunnel applications such as the National Transonic Facility at NASA Langley Research Center temperatures may be as low as approximately $-173°$ C. In the Space Shuttle Main Engine pressure must be sensed in the fuel supply lines. In this application gaseous and liquid oxygen or hydrogen are present at very high pressures and very low temperatures. The sensors must be able to operate within a temperature range from $-253°$ C. to $60°$ C. and pressures from 0 to 5,000 psi. Additionally, they will be subject to 80 g vibrations from 25 to 2,000 Hz and up to 400 g impulse shock. Chemical resistance to $O_2$ and $H_2$ is also important to long term sensor survivability and reliability.

Brown, et. al. (U.S. Pat. No. 5,454,270) disclose a hermetically sealed pressure sensor for use in a hostile environment. Generally, the device of Brown is for use in measuring fluid or gas pressures where the fluids or gases may damage the sensing device. Examples given include petrochemicals, freons, solvents, and alcohols. To protect the device from the corrosive effects of the hostile environment it is sealed in a plastic housing and only one face of the pressure transducer is exposed to the hostile environment. The '270 patent further discloses a stress isolation base to which a differential pressure transducer is attached. It is specified that the base is made of a ceramic material such as alumina, or other material having a similar coefficient of thermal expansion as silicon, the material from which the differential pressure transducer is made. This choice helps the pressure sensor to be accurate over a range of temperatures given in the disclosure to be approximately $-40°$ C. to $+150°$ C.

Maurer (U.S. Pat. No. 5,351,550) discloses a pressure sensor comprising a pressure transducer, a housing member and a pressure sensor die having a diaphragm with at least one piezoresistive component disposed thereon.

Maurer (U.S. Pat. No. 5,327,785) discloses a pressure sensor with an elastomeric member for heat dissipation.

Kurtz et. al. (U.S. Pat. No. 5,303,594) disclose a pressure transducer using polycrystaline diamond film. The advantages disclosed include high temperature sensing beyond the range available with silicon pressure sensors and improved output signal strength over silicon carbide sensors.

Chapman (U.S. Pat. No. 5,116,331) discloses a pressure transducer for use in cryogenic environments. The '331 patent discloses that by increasing boron dopant density in the piezoresistive bridge elements of a sensor from approximately $10^{16}$ boron/cm$^3$ to $>1.3 \times 10^{19}$ boron/cm$^3$ the sensor becomes more thermally stable. Also disclosed are the drawbacks to highly doped sensors including propensity to mechanical failure and reduced pressure sensitivity.

In the '331 patent, a plurality of highly doped ($10^{19-1021}$ boron/cm$^3$) silicon piezoresistive pressure sensors are mounted on a substrate for sensing pressures in a wind tunnel environment. Each pressure sensor is paired with a temperature sensor to provide for temperature correction to the sensors output in real time. Increased amplification is used to make up for the problem of reduced pressure sensitivity of the highly doped sensors. The sensor is mounted to a borosilicate glass substrate such as Corning, Inc.'s Pyrex 7740. Borosilicate is chosen to provide a coefficient of thermal expansion similar to that of highly doped silicon. In the '331 patent this is given as 2.5 ppm/C for highly doped silicon, and 3.2 ppm/C for Pyrex 7740, compared to 6.5 ppm/C for alumina, the material disclosed in the '270 patent to Brown above.

Sahagen (U.S. Pat. No. 5,088,329) discloses a sapphire force collector diaphragm having piezoresistive silicon films formed thereon. The piezoresistive films are arranged to form a Wheatstone bridge. One side of the force collector is in contact with the media being measured, the other, having the piezoresistive silicon films is not, thereby allowing the device to be used in high temperature or corrosive applications. The '329 patent notes that in a diaphragm type sensor there is a preferred region of the diaphragm in which the piezoresistive elements should be placed. Within a region having radius R1, corresponding in the '329 patent to that region of the diaphragm which is unsupported, there is a second region having radius R2, within which deflection of the diaphragm does not cause measurable stresses. Thus, the piezoresistive elements are preferably placed in the annular region between R1 and R2. The '329 patent discloses that R2 is preferably approximately 0.66R1.

Graeger, et. al. (U.S. Pat. No. 5,024,097) disclose a silicon body having piezoresistive elements formed thereon. The piezoresistive elements are further arranged to form a Wheatstone bridge. The silicon body has a blind hole forming a cavity between the silicon body and its substrate forming a diaphragm.

SUMMARY OF THE INVENTION

It is an object of the present invention to provide a pressure sensor for use in high pressure, cryogenic environments.

It is a further object of the present invention to accomplish the forgoing object in a sensor that can withstand extreme physical and chemical conditions.

To achieve the forgoing objects a sensor is provided which comprises four highly doped silicon piezoresistive pressure sensor dice in an absolute pressure measurement configuration. That is, the sensor dice are bonded to a silicon substrate in vacuum, providing an evacuated region between the sensor dice and the substrate so that absolute pressure, rather than a comparative pressure may be measured. Four sensors are used to provide more accurate measurements through averaging of data from each. Additionally, multiple sensors allow for the possibility that one of the sensors might be damaged or defective.

The pressure dice are selected to have an impurity density of approximately $10^{20}$ atoms of Boron per cubic centimeter to provide increased thermal stability at cryogenic temperatures. Temperature coefficient of offset voltage is more stable in highly doped silicon sensors.

The absolute pressure sensors are in turn bonded to aluminum nitride substrates. The sensors may be bonded in pairs, two for each aluminum nitride substrate. Alternatively, all four sensors may be bonded to a single substrate. Aluminum nitride is chosen due to its coefficient of thermal expansion which is similar to that of the highly doped silicon from which the dice are made. In addition, the bonding agent must be chosen with the same consideration in mind. Indium and Au/Sn are two suitable bonding agents.

The dice and their substrates are then placed in a housing that is compatible with the physical environment in which the sensors will be used. The pressure vessel is made of stainless steel and may withstand high pressure, low temperatures, high shocks and repeated vibrations. In addition, the pressure vessel is designed with electrical contacts for feeding data from the sensor dice through to an outside data collector, this must be achieved without allowing pressure feedthrough leak rate of greater than $10^{-9}$ Torr.

DESCRIPTION OF PREFERRED EMBODIMENTS

Figure 1:
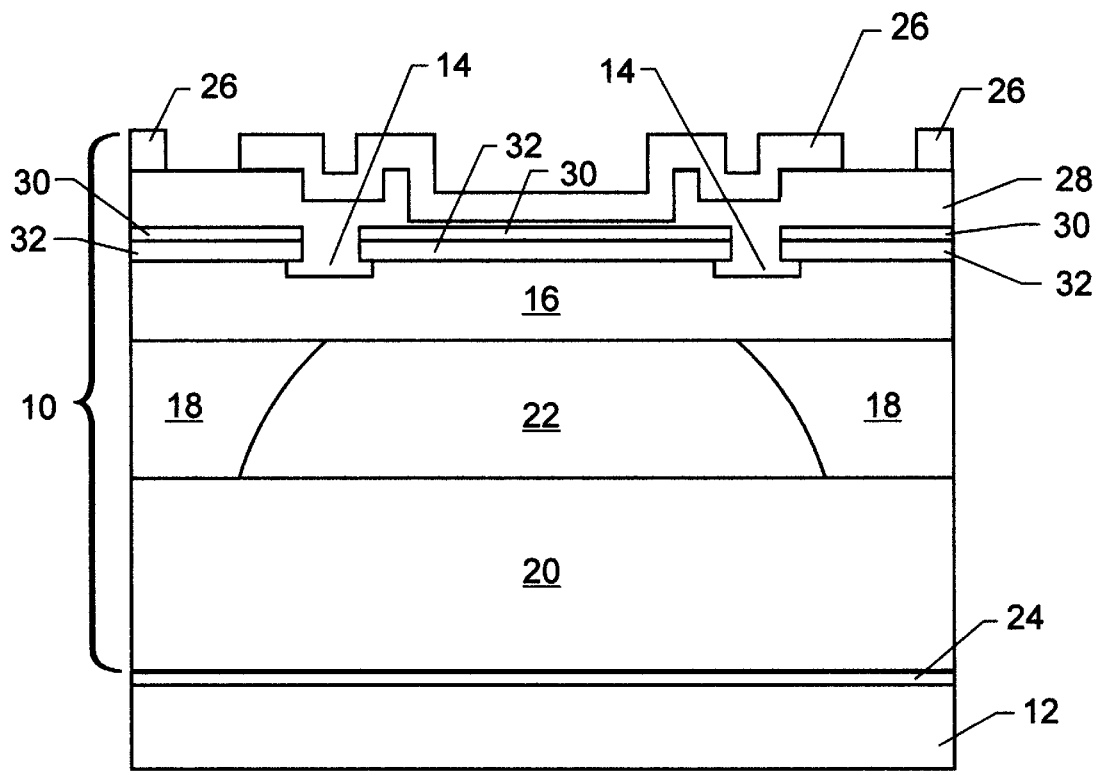
FIG. 1 is a cross section of a pressure sensor mounted to a substrate.
Figure 4:
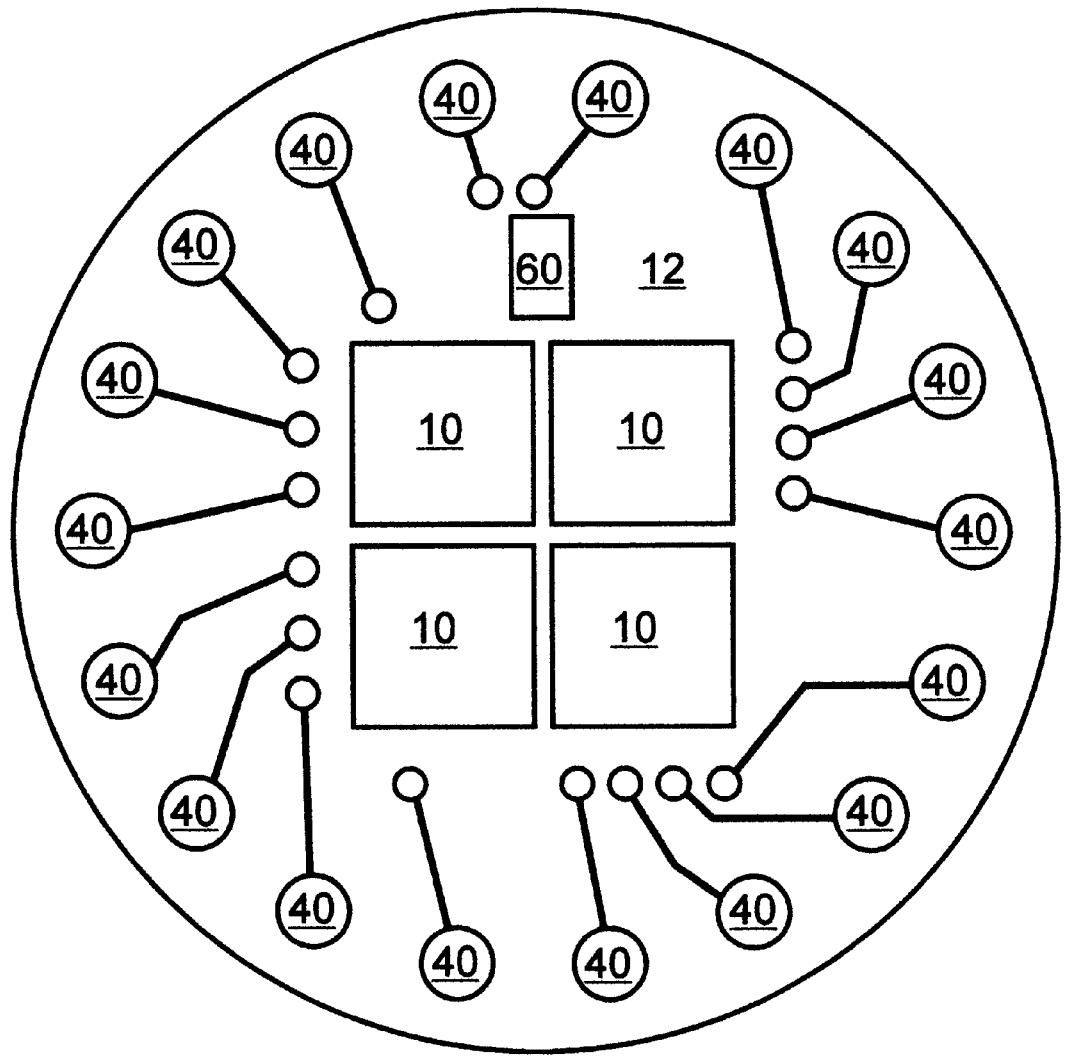
FIG. 4 is a drawing of four pressure sensors mounted on a single substrate.

Referring now to FIG. 1 and FIG. 4, highly doped silicon pressure sensors 10 are bonded to an aluminum nitride substrate 12 in an absolute pressure sensing configuration. The silicon pressure sensor dice have four piezoresistance elements 14 forming a Wheatstone bridge configuration on a monolithic silicon substrate 18. The pressure sensor dice are micromachined to form a pressure sensing diaphragm with a support rim.

The piezoresistance elements are diffused into the monolithic silicon substrate 18 in an epitaxial layer 16. The concentration of impurities determines the density of charge carriers available in the conduction band of the silicon bridge resistor. A highly doped resistor, i.e. one with impurity density of approximately $10^{20}$ atoms/cm$^3$ gives a good balance of stability and sensitivity.

The support rim is bonded to a silicon substrate 20. The bonding is performed in vacuum to make the sensor an absolute device. The pressure sensor dice and the silicon substrate together comprise an absolute pressure sensor. Region 22 is evacuated.

The absolute pressure sensor is further bonded to a pressure sensor substrate 12. Aluminum nitride with thin film deposited gold conductors is used for the pressure sensor substrate. Cryogenically compatible bonding materials 24 must be used to bond the pressure sensor to the pressure sensor substrate. For example Au/Sn eutectic material may be used. Alternately, cryogenically compatible Indium bonding material may be used.

Referring now to FIG. 1, a cross section of the pressure sensor is shown. A surface mask of plasma deposited nitride 26 is over a metalized conducting layer 28. A chemical vapor deposited nitride insulating layer 30 and an insulating oxide layer 32 lie underneath the metalized conducting layer 28.

Figure 2:
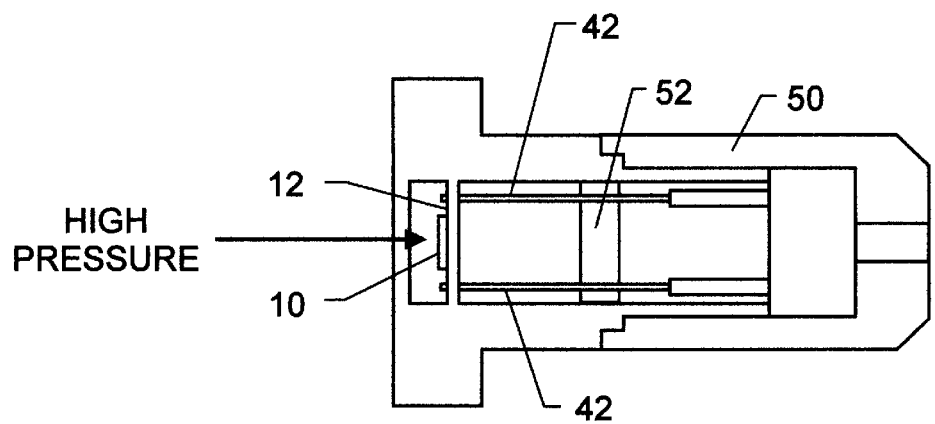
FIG. 2 is a drawing of four pressure sensors mounted on one substrate and contained in a housing.
Figure 3:
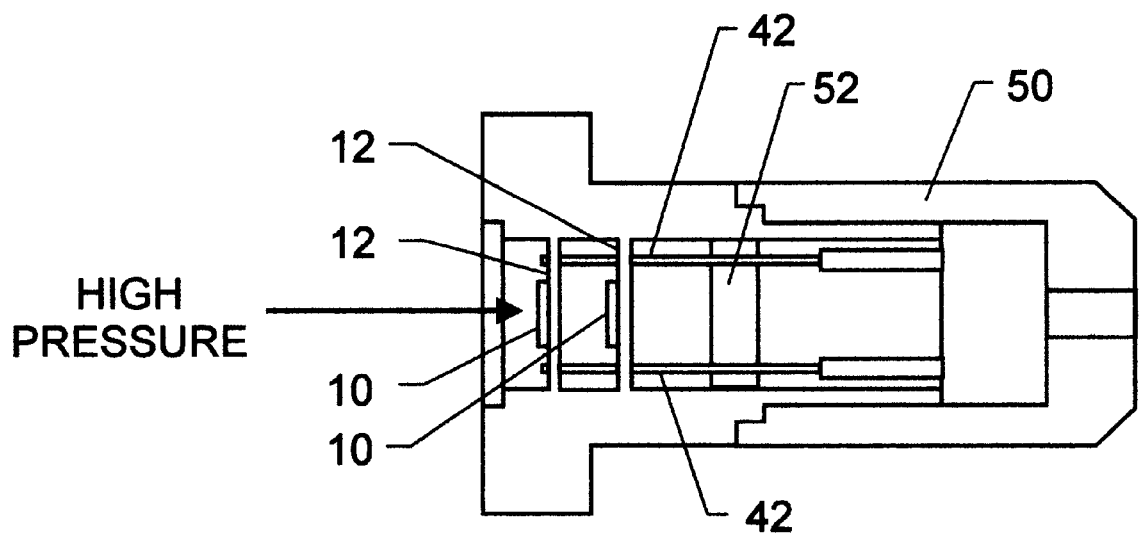
FIG. 3 is a drawing of four pressure sensors mounted on two substrates and contained in a housing.
Figure 5:
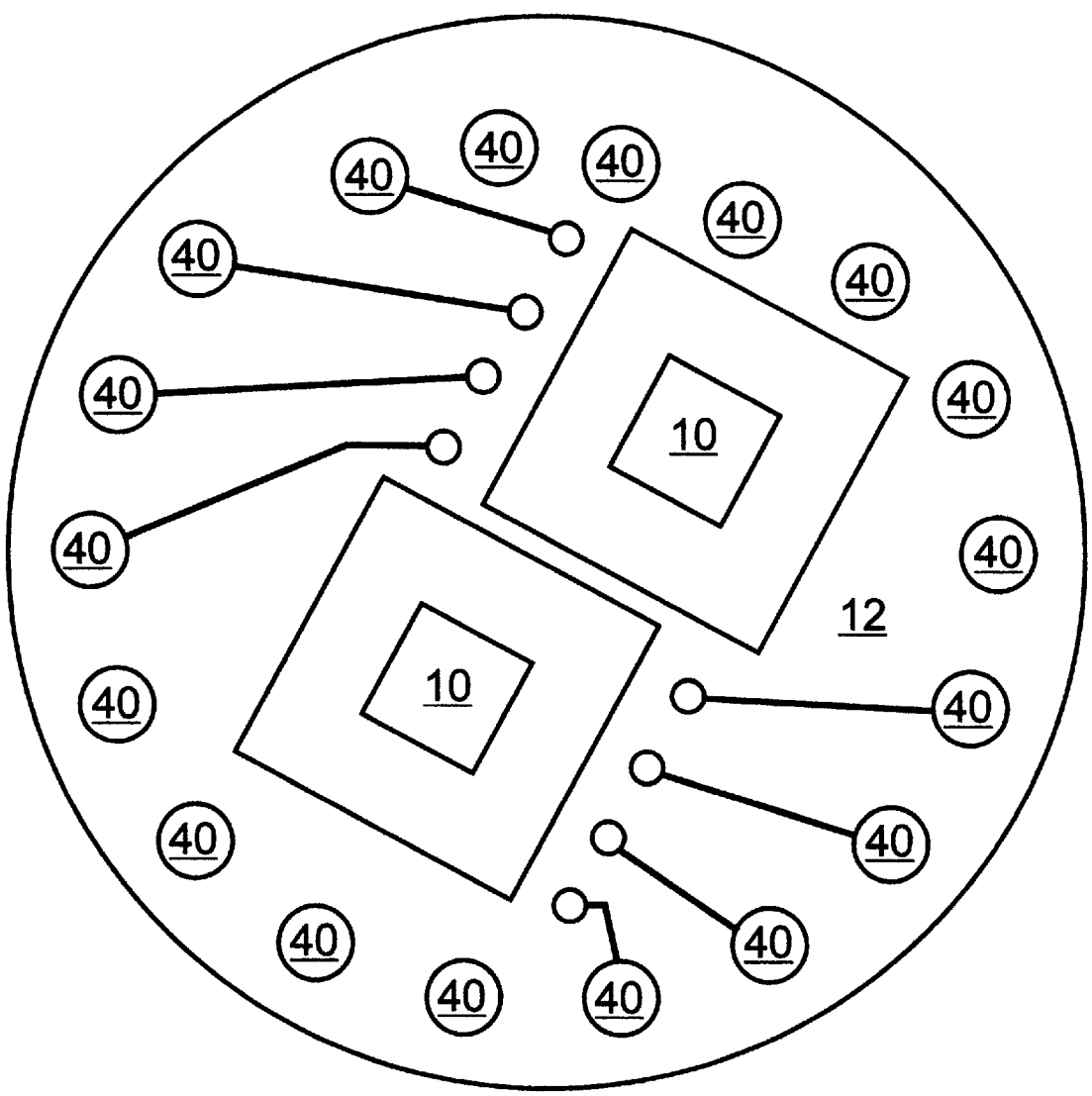
FIG. 5 is a drawing of two pressure sensors mounted on a single substrate.

Referring now to FIGS. 2, 3, 4 and 5, the pressure sensor substrate 12 has a plurality of holes 40 therethrough to accommodate feedthrough pins 42 to allow electrical connection from the pressure sensor substrate's conductors to a data collection means and a power source. In one preferred configuration, two pressure sensors are bonded to a single pressure sensor substrate as shown in FIG. 5 and two pressure sensor substrates are placed in a single pressure vessel as shown in FIG. 3. A second preferred configuration uses four pressure sensors bonded to a single pressure sensor substrate as shown in FIG. 4. A pressure vessel having a single pressure sensor substrate is shown in FIG. 2.

The pressure sensor substrate and bonded absolute pressure sensors are together contained in a pressure vessel 50. One example of an appropriate material for the pressure vessel is #316 stainless steel. The pressure vessel has electrical contacts according to MIL-123011, class 2, with gold plating. The pressure vessel is designed to withstand 12,000 psi maximum operational pressure, temperature from 20 K to 333 K, shock level of 400 g half-wave 4 millisecond sinusoid and 80 g from 20 to 2,000 Hz and have feedthrough leak rate less than $10^{-9}$ Torr.

Electrical connection from the absolute pressure sensor through the pressure sensor substrate and the wall 52 of the pressure vessel is provided by feedthrough pins 42. In a configuration with two sensor dice per pressure sensor substrate, the feedthrough pins are arranged such that each pair of sensors are using a different set of pins. An example is illustrated in FIG. 3, in this example each chip requires four leads, a ground, a +5 V power source and two output voltages. Thus eighteen holes are provided for feedthrough pins. In this example, eight pins are used for the two sensors shown, a second group of eight pins are used for the two sensors on the second pressure sensor substrate and the two remaining pins are used for a temperature sensor.

An advantageous configuration, shown in FIG. 4 is to place a temperature sensor 60 on the pressure sensor substrate so that temperature data may also be collected. Temperature data may then be used to process the pressure data and to correct for changes in sensitivity of the pressure sensors.

Other variations will be readily apparent to those of skill in the art. The forgoing is not intended to be an exhaustive list of modifications but rather is given by way of example. It is understood that it is in no way limited to the above embodiments, but is capable of numerous modifications within the scope of the following claims.

We claim:

1. A pressure sensor module comprising:

a plurality of absolute pressure sensors, wherein each absolute pressure sensor comprises a monolithic silicon substrate having an evacuated region, four piezoresistance elements in a Wheatstone bridge configuration on the monolithic silicon substrate forming a pressure sensor die and a silicon substrate, the outside periphery of the pressure sensor die bonded to the silicon substrate;

at least one aluminum nitride substrate;

pressure vessel;

the plurality of absolute pressure sensors bonded to the aluminum nitride substrate with a cryogenically compatible bonding agent; and the aluminum nitride substrate situated within the pressure vessel.

2. A pressure sensor module comprising:

four absolute pressure sensors, wherein each absolute pressure sensor comprises a monolithic silicon substrate having an evacuated region, four piezoresistance elements in a Wheatstone bridge configuration on the monolithic silicon substrate forming a pressure sensor die, and a silicon substrate, the outside periphery of the pressure sensor die bonded to the silicon substrate;

an aluminum nitride substrate;

a pressure vessel;

the four absolute pressure sensors bonded to the aluminum nitride substrate with a cryogenically compatible bonding agent; and the aluminum nitride substrate situated within the pressure vessel.

* * * * *